(No Model.)

G. T. MOE.
DAMPER.

No. 499,747. Patented June 20, 1893.

Witnesses
John Dinie
Thos. Robertson

Inventor
George T. Moe,
By D. H. Robertson
Attorney

UNITED STATES PATENT OFFICE.

GEORGE T. MOE, OF PHILADELPHIA, PENNSYLVANIA, ASSIGNOR OF ONE-HALF TO ROBERT PIERCE, JR., AND MICHAEL M. RITER, JR., OF SAME PLACE.

DAMPER.

SPECIFICATION forming part of Letters Patent No. 499,747, dated June 20, 1893.

Application filed August 12, 1892. Renewed May 18, 1893. Serial No. 474,709. (No model.)

*To all whom it may concern:*

Be it known that I, GEORGE T. MOE, a citizen of the United States of America, residing at Philadelphia, in the county of Philadelphia, Pennsylvania, have invented certain new and useful Improvements in Dampers for Hot-Air Pipes, &c., of which the following is a specification, reference being had therein to the accompanying drawings.

This improvement relates to that class of dampers for use in hot air pipes, which has a detachable disk-damper riveted or otherwise attached to a suitable handle, and the object of the invention is to provide an improved article that can be cheaply and easily made to be sold to dealers in hot air furnaces, and it is so constructed that said dealers may provide the damper-disks of any size and attach them to the handle, thereby using the same sized handle for any sized damper-disk.

The invention further consists in the peculiar construction, arrangement and combinations of parts hereinafter more particularly described and then definitely claimed.

Figure 1:
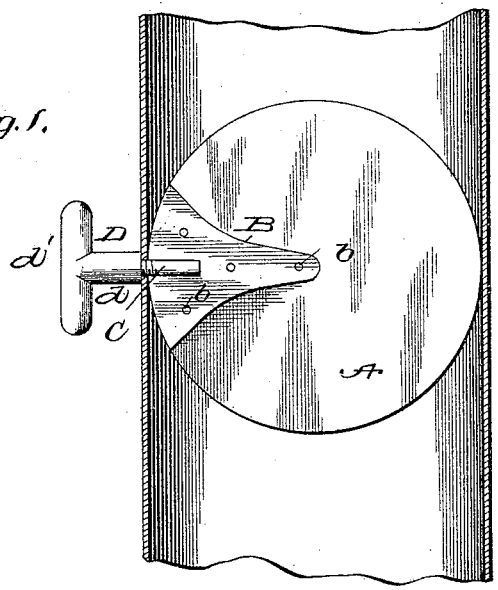
Figure 2:
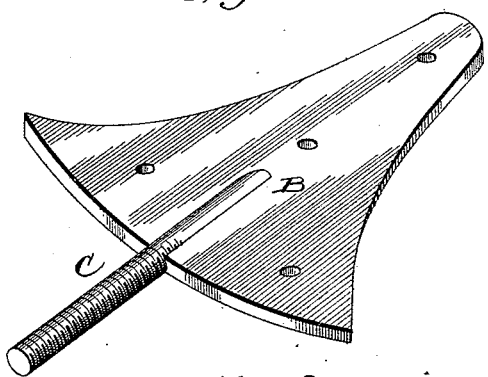
Figure 3:
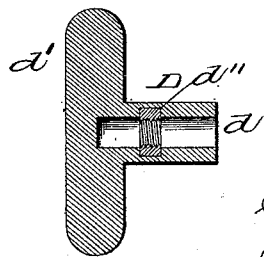

In the accompanying drawings which fully illustrate my invention—Figure 1 is a sectional view of a hot air, or other pipe, with my improved damper in position. Fig. 2 is a view of the cast metal plate or shank and its spindle; and Fig. 3 is a sectional view of the handle.

Referring now to the details of the drawings by letter—A represents the damper disk, which is of any approved form. This disk is made of any suitable size and is attached to the cast metal plate or shank B of my handle just before it is fitted in the pipe.

B represents the cast metal plate or shank, which is constructed to be riveted or otherwise fastened to the damper-disk as shown at *b*, and has a wrought-iron bolt or rod C cast integral therewith. This rod or bolt C has its end screw-threaded and is designed to pass through the hollow handle D and be secured thereto by a nut cast into the handle. The handle D is made preferably of cast iron and consists of a hollow part *d* with a cross bar *d'* at right angles to the part *d* to form the handle by which the damper is operated. In the hollow part of the handle is cast a nut *d''* by which the handle is screwed to the rod or bolt projecting from the shank. These handles, together with the shank, are sold by the manufacturer in dozen or gross lots to the dealer; the damper disks being sold separate or made by the dealer. The dealer, when putting a furnace in a house (if he makes his own damper disks) takes a piece of sheet metal from which he cuts the damper disk A, the size of the pipe in which it is to be used. The shank B is then secured to said disk (by riveting or otherwise), the bolt of the shank is inserted through a hole in the hot air pipe, and the handle secured to the bolt by means of the nut cast in said handle; enough space being left between the shank and handle to allow of the ready handling of the damper.

From the above description it will be seen that I have constructed a handle and shank for dampers to be used in hot air pipes, which is cheaply made, and is very convenient in operation. When a damper of this character is used it is easily seen that a dealer does not have to keep in stock dampers for a dozen or more different sized pipes, as is sometimes the case, but can with my invention, make his damper disk of the suitable size and attach it to one of my handles when it will be ready for any pipe for which he makes the disk.

What I claim as new is—

1. A handle for dampers, comprising the shank B having the rod or bolt permanently secured thereto, a handle having a nut cast integral therewith and constructed to fit over the rod or bolt of the shank and be screwed thereon, substantially as described.

2. A handle for dampers, comprising the shank B adapted to be connected to a damper-disk and having the rod or bolt permanently secured thereto, a handle having a nut cast integral therewith and constructed to fit over the rod or bolt of the shank and be screwed thereon, substantially as described.

In testimony whereof I affix my signature, in presence of two witnesses, this 1st day of August, 1892.

GEORGE T. MOE.

Witnesses:
  FREDERICK T. FRIES,
  GEORGE BRODBECK, Jr.